US008214574B2

(12) United States Patent
Chinya et al.

(10) Patent No.: US 8,214,574 B2
(45) Date of Patent: Jul. 3, 2012

(54) EVENT HANDLING FOR ARCHITECTURAL EVENTS AT HIGH PRIVILEGE LEVELS

(75) Inventors: Gautham Chinya, Hillsboro, OR (US); Hong Wang, Fremont, CA (US); Scott Dion Rodgers, Hillsboro, OR (US); Chris J. Newburn, South Beloit, IL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/517,700

(22) Filed: Sep. 8, 2006

(65) Prior Publication Data

US 2008/0065804 A1    Mar. 13, 2008

(51) Int. Cl.
G06F 13/24 (2006.01)
G06F 13/32 (2006.01)

(52) U.S. Cl. ............ 710/269; 710/260; 710/262

(58) Field of Classification Search ......... 710/260–269
See application file for complete search history.

(56) References Cited

U.S. PATENT DOCUMENTS

| | | | | |
|---|---|---|---|---|
| 3,984,820 A | * | 10/1976 | Stanley et al. ............ | 710/265 |
| 4,020,471 A | * | 4/1977 | Woods et al. ............ | 710/264 |
| 4,075,691 A | * | 2/1978 | Davis et al. ............ | 710/64 |
| 4,816,996 A | * | 3/1989 | Hill et al. ............ | 710/5 |
| 5,023,823 A | * | 6/1991 | Cargin et al. ............ | 361/679.4 |
| 5,131,081 A | * | 7/1992 | MacKenna et al. ............ | 710/22 |
| 5,136,714 A | * | 8/1992 | Braudaway et al. ............ | 710/260 |
| 5,276,888 A | | 1/1994 | Kardach et al. | |
| 5,325,360 A | * | 6/1994 | Friedrich ............ | 370/453 |
| 5,345,567 A | * | 9/1994 | Hayden et al. ............ | 712/228 |
| 5,404,535 A | * | 4/1995 | Barlow et al. ............ | 710/264 |
| 5,410,710 A | * | 4/1995 | Sarangdhar et al. ............ | 710/266 |
| 5,471,618 A | | 11/1995 | Isfeld et al. | |
| 5,495,615 A | * | 2/1996 | Nizar et al. ............ | 710/260 |
| 5,625,788 A | * | 4/1997 | Boggs et al. ............ | 712/214 |
| 5,694,606 A | * | 12/1997 | Pletcher et al. ............ | 710/261 |
| 5,727,217 A | * | 3/1998 | Young ............ | 710/260 |
| 5,745,095 A | * | 4/1998 | Parchem et al. ............ | 345/633 |
| 5,778,252 A | * | 7/1998 | Sangveraphunsiri et al. .. | 710/21 |
| 5,896,549 A | * | 4/1999 | Hansen et al. ............ | 710/22 |
| 5,943,507 A | * | 8/1999 | Cornish et al. ............ | 710/48 |
| 5,974,440 A | * | 10/1999 | Brooks et al. ............ | 710/262 |
| 6,415,344 B1 | | 7/2002 | Jones et al. | |
| 6,574,683 B1 | | 6/2003 | Comisky et al. | |
| 6,697,810 B2 | * | 2/2004 | Kumar et al. ............ | 707/10 |

(Continued)

FOREIGN PATENT DOCUMENTS

EP          297892 A2  *  1/1989

(Continued)

OTHER PUBLICATIONS

"NN971061: Latency Optimized Interrupt to S/390 Parallel Processors", Oct. 1, 1997, IBM, IBM Technical Disclosure Bulletin, vol. 40, Iss. 10, pp. 61-64.*

(Continued)

Primary Examiner — Faisal M Zaman
(74) Attorney, Agent, or Firm — Blakely, Sokoloff, Taylor & Zafman LLP (57) ABSTRACT

Methods and apparatus to perform event handling operations are described. In one embodiment, after an event (such as an architectural event occurs), the corresponding occurrence response (e.g., a yield event) may cause generation of an interrupt. Other embodiments are also described.

21 Claims, 6 Drawing Sheets

U.S. PATENT DOCUMENTS

| | | | |
|---|---|---|---|
| 7,472,214 B2 * | 12/2008 | Nankaku et al. | 710/264 |
| 7,861,104 B2 * | 12/2010 | Fung et al. | 713/375 |
| 8,032,737 B2 * | 10/2011 | Kang et al. | 712/229 |
| 2002/0124237 A1 * | 9/2002 | Sprunt et al. | 717/127 |
| 2004/0163083 A1 * | 8/2004 | Wang et al. | 718/102 |
| 2005/0071840 A1 * | 3/2005 | Neiger et al. | 718/1 |
| 2005/0166039 A1 | 7/2005 | Wang et al. | |
| 2006/0277395 A1 * | 12/2006 | Fowles | 712/227 |
| 2006/0294347 A1 * | 12/2006 | Zou et al. | 712/244 |
| 2007/0067534 A1 * | 3/2007 | Butler et al. | 710/260 |
| 2007/0079294 A1 * | 4/2007 | Knight et al. | 717/130 |
| 2007/0214342 A1 * | 9/2007 | Newburn et al. | 712/216 |
| 2008/0005546 A1 * | 1/2008 | Wang et al. | 712/244 |
| 2008/0046668 A1 * | 2/2008 | Newburn et al. | 711/154 |
| 2008/0162910 A1 * | 7/2008 | Newburn et al. | 712/244 |

FOREIGN PATENT DOCUMENTS

| | | | |
|---|---|---|---|
| EP | 851363 A2 * | 7/1998 | |
| JP | 2006163730 A * | 6/2006 | |
| WO | WO 9120042 A1 * | 12/1991 | |
| WO | WO 2008086456 A2 * | 7/2008 | |

OTHER PUBLICATIONS

"NA9203326: Managed Interrupt Status Queue and Auto Vector Generator for Personal Computer Systems", Mar. 1, 1992, IBM, IBM Technical Disclosure Bulletin, vol. 34, Iss. 10A, pp. 326-330.*

"NA9008396: Local Test of Arbitration and Interrupts Using a Microprocessor", Aug. 1, 1990, IBM, IBM Technical Disclosure Bulletin, vol. 33, Iss. 3A, pp. 396-398.*

"NN9007215: Single-Chip Implementation of an Interrupt Structure", Jul. 1, 1990, IBM, IBM Technical Disclosure Bulletin, vol. 33, Iss. 2, pp. 215-217.*

"International Search Report and Written Opinion of the International Searching Authority", PCT/US2007/076631, (Jan. 31, 2008), 9 pgs.

Orenstein, Doron, et al., "A Programmable Event Driven Yield Mechanism Which May Activate Service Threads", Pending/Non-Published U.S. Appl. No. 11/134,687, filed May 19, 2005.

Zou, Xiang, et al., "A Programmable Event-Driven Yield Mechanism", Pending/Non-Published U.S. Appl. No. 11/395,884, filed Mar. 31, 2006.

* cited by examiner

FIG. 7 the invention may be practiced without the specific details. In
EVENT HANDLING FOR ARCHITECTURAL EVENTS AT HIGH PRIVILEGE LEVELS

BACKGROUND

The present disclosure generally relates to the field of electronics. More particularly, an embodiment of the invention relates to techniques for controlling flow after occurrence of architectural events at high privilege levels in a processor.

Various mechanisms may be used to change the flow of control (such as the processing path or instruction sequence being followed) in a processor. For example, an interrupt may be used to change the flow of control in a processor. Generally, an interrupt may be triggered by an external interrupt signal provided to a processor. The processor may respond to the interrupt by jumping to an interrupt handler routine. In some cases, interrupts may be masked by the operating system executing at a supervisor privilege level, such that a software program executing at a relatively lower privilege level than the operating system may have no opportunity to modify such control flow changing events without modifying the operating system (OS).

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various mechanisms, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may be utilized to perform event handling operations. In an embodiment, an "event" refers to a condition that may or may not require some action to be taken by logic. Furthermore, events may be classified into different types based on the action that is to be taken. For example, certain exceptions (such as divide by zero) may be characterized as synchronous events that occur each time a corresponding instruction is executed. On the other hand, interrupts that are generated by external devices may be characterized as asynchronous events, in part, because they may occur at any time. In one embodiment, an "architectural event" refers to an event or condition that may be monitored (e.g., by programming information corresponding to the architectural event into a state (e.g., such as a channel discussed with reference to FIG. 2). In an embodiment, software may configure a channel to monitor certain architectural events which may not otherwise be observable by software and/or hardware. For example, a last level cache miss may be defined as an architectural event that is used to perform dynamic profile guided optimizations. Also, an architectural event may be defined to monitor conditions that are occurring on a co-processor that is located on the same integrated circuit chip as a processor. In an embodiment, an "architectural event" may generally refer to an event or condition that occurs within processing resources or other logic present on the same integrated circuit chip as a processor.

In one embodiment, after an event (such as an architectural event occurs) occurs at a privilege level higher than a user privilege level (e.g., a highest privilege level that may also be referred to as a privilege level 0 or supervisor privilege level), the corresponding occurrence response (e.g., a yield event) may cause generation of an interrupt. In an embodiment, the term "privilege level" refers to an attribute associated with the execution mode that determines which operations are allowed and which are disallowed. For example, application programs may be executed at a privilege level (e.g., a user privilege level) that does not allow the application programs to interfere with system state or otherwise to execute instructions that interfere with system state. In some embodiments, the operating system may execute at a supervisor privilege level, e.g., to manipulate system state. Further, a high privilege level (such as a privilege level higher than a user privilege level) may allow operating system software to safeguard system state such that application programs executing at a lower privilege level are disallowed from manipulating system state. Additionally, some embodiments may enable handling of events at a privilege level that is higher than a user privilege level, e.g., without requiring changes to an operating system or other software executing at a supervisor privilege level (such as a device driver). In some embodiments, generation of an interrupt (e.g., corresponding to the occurrence response, such as a yield event) for a high privilege level (e.g., a supervisor privilege level) may provide a relatively easier migration path that may reduce the impact on changes to the operation system code that executes in supervisor privilege level, in part, because supervisor privilege level software may be already aware of how to deal with pre-emption due to interrupts.

Figure 1:
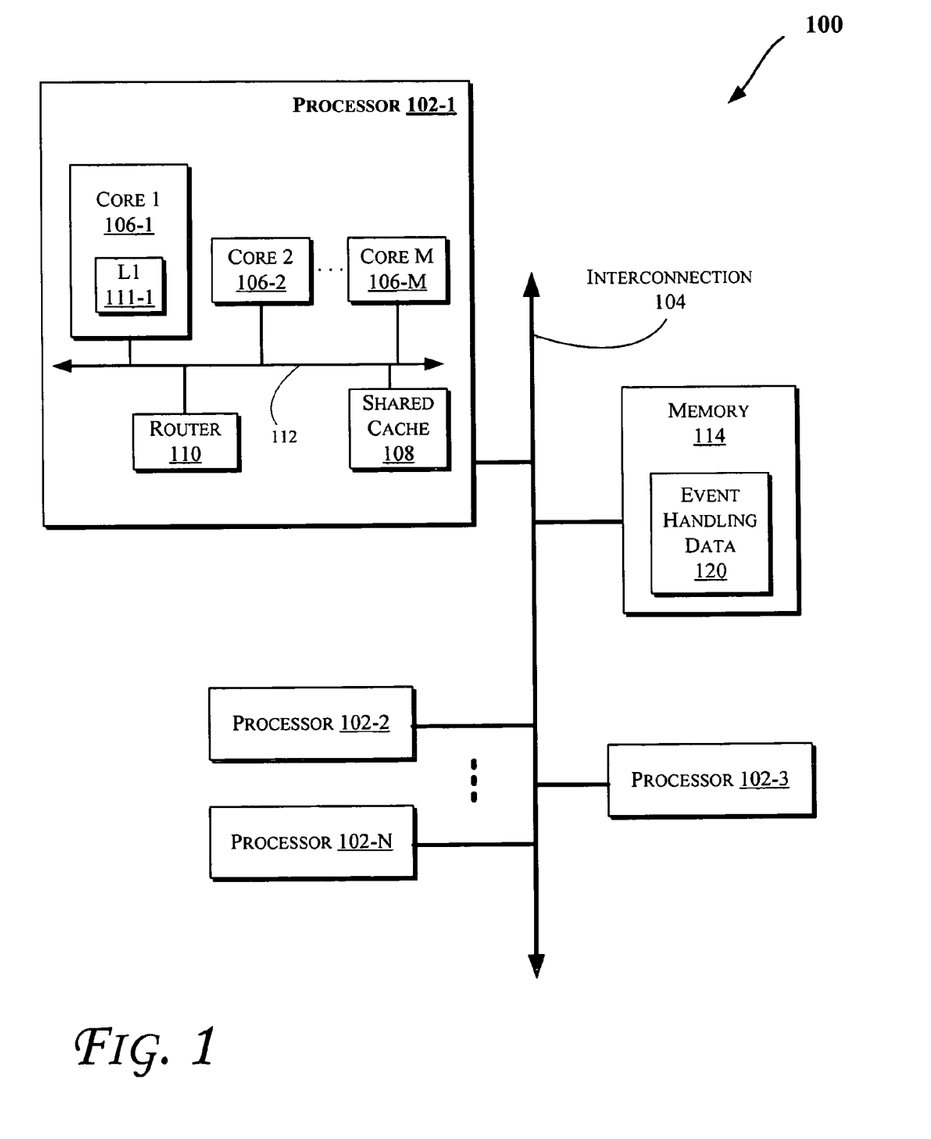
FIGS. 1, 6, and 7 illustrate block diagrams of embodiments of computing systems, which may be utilized to implement various embodiments discussed herein.

In an embodiment, various logic provided in a processor may be used to perform event handling tasks, such as the processors discussed with reference to FIGS. 1, 2, 6, and 7. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared caches (such as cache 108) and/or private caches (such as level 1 (L1) cache 111-1, generally referred to herein as "L1 cache 111"), buses or interconnections (such as a bus or interconnection network 112), memory controllers (such as those discussed with reference to FIGS. 6 and 7), or other components.

In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, event handling data 120 may be stored in the memory 114 (or an interrupt controller as will be further discussed with reference to FIG. 4). Moreover, the event handling data 120 may be utilized by a component of the core 106 to generate an interrupt in response to an event occurrence, as will be further discussed herein, for example, with reference to FIGS. 2-5.

Figure 2:
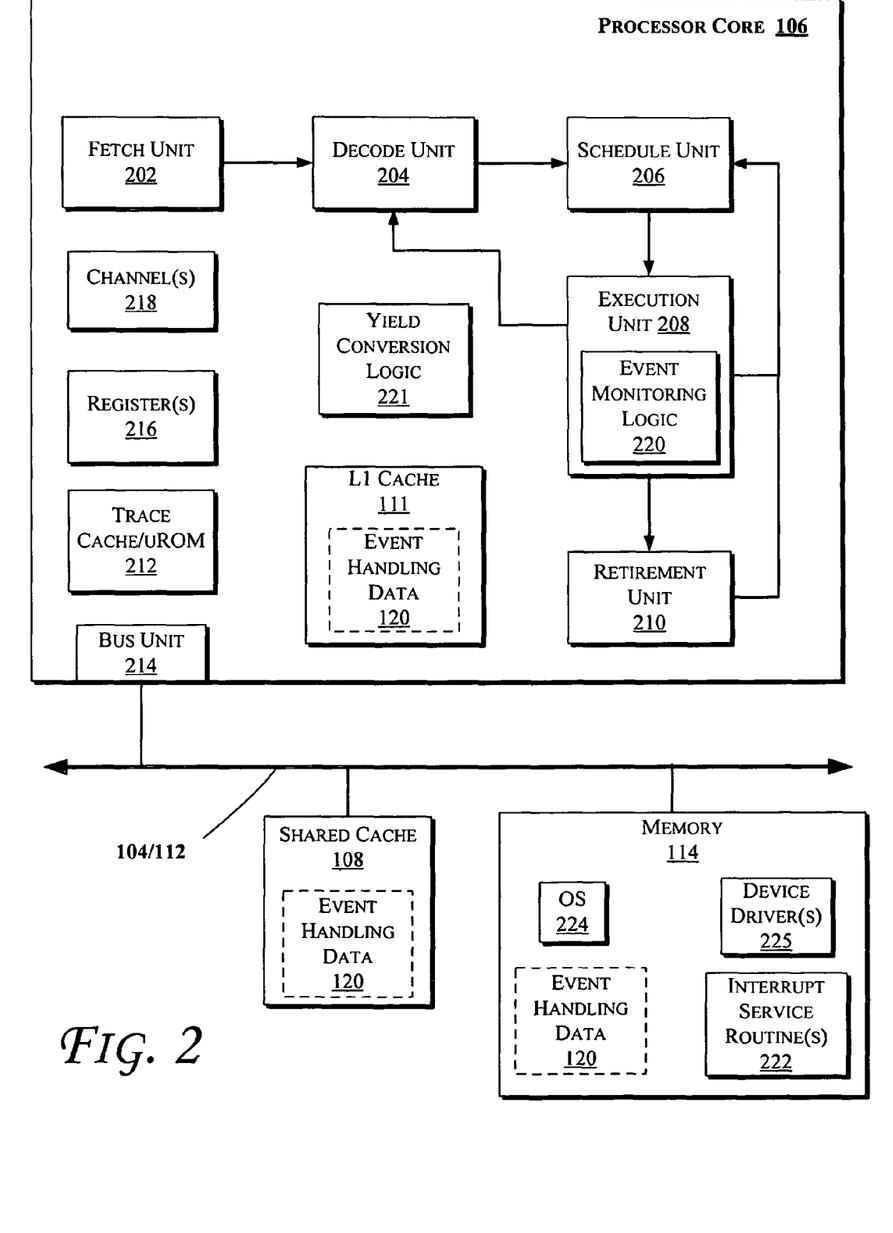
FIG. 2 illustrates a block diagram of portions of a processor core and other components of a computing system, according to an embodiment of the invention.

FIG. 2 illustrates a block diagram of portions of a processor core 106 and other components of a computing system, according to an embodiment of the invention. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 2, the processor core 106 may include a fetch unit 202 to fetch instructions for execution by the core 106. The instructions may be fetched from any storage devices such as the memory 114 and/or the memory devices discussed with reference to FIGS. 6 and 7. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit, such as a memory execution unit, an integer execution unit, a floating-point execution unit, or other execution units. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may additionally include a trace cache or microcode read-only memory (uROM) 212 to store microcode and/or traces of instructions that have been fetched (e.g., by the fetch unit 202). The microcode stored in the uROM 212 may be used to configure various hardware components of the core 106. In an embodiment, the microcode stored in the uROM 212 may be loaded from another component in communication with the processor core 106, such as a computer-readable medium or other storage device discussed with reference to FIGS. 6 and 7. The core 106 may also include a bus unit 214 to enable communication between components of the processor core 106 and other components (such as the components discussed with reference to FIG. 1) via one or more buses (e.g., buses 104 and/or 112). The core 106 may additionally include one or more registers 216 to store data accessed by various components of the core 106.

Additionally, the processor core 106 illustrated in FIG. 1 may include one or more channels 218 that correspond to a set of architecture states. Each privilege level (such as privilege level 0 or supervisor privilege level (e.g., the highest privilege level), privilege level 3 (e.g., a relatively lower privilege level that may correspond to a user level privilege in an embodiment), etc.) may have a corresponding channel. Further, each channel 218 may correspond to one or more scenarios and corresponding yield events. In an embodiment, the channels 218 may contain scenario specifications. In turn, a yield event may be signaled when the scenario associated with the channel triggers. Hence, a yield event may be the occurrence response to a scenario.

Furthermore, the core 106 may include an event monitoring logic 220, e.g., to monitor the occurrence of one or more events that may be associated with architecturally defined scenarios (e.g., in the channel(s) 218) that may be used to trigger a corresponding yield event. As shown in FIG. 2, the logic 220 may be provided within the execution unit 208. However, the logic 220 may be provided elsewhere in the processor core 106. As will be further discussed herein, e.g., with reference to FIGS. 3-5, the logic 220 may generate a signal after a monitored event occurs and a yield conversion logic 221 may in response to the generated signal cause generation of an interrupt, e.g., based on data stored in the channels 218. For example, the events that are being monitored (e.g., with reference to data stored in the channels 218) may occur asynchronously with respect to the execution of the current instruction sequence on the processor core 106.

Moreover, as shown in FIG. 2, the event handling data 120 may be stored (or cached) in one or more of the caches 111 and/or 108, instead of or in addition to the memory 114. The memory 114 may also store one or more: interrupt service routines 222 (e.g., that may be triggered in response to an interrupt that is generated in response to a yield event by the logic 220), operating systems 224 (e.g., to manage hardware or software resources of a computing system that includes the core 106), and/or device drivers 225 (e.g., to enable communication between the OS 224 and various devices such as those discussed with reference to FIGS. 6 and 7). In one embodiment, after the logic 221 causes generation of an interrupt (e.g., corresponding to a yield event), the address of an interrupt service routine (222) may be obtained from the event handling data 120 (which may be stored in an interrupt descriptor table in some embodiments).

In an embodiment, an event may be handled by one or more of the interrupt service routines 222 (e.g., which may also be cached in the caches 111 and/or 108 in various embodiments) that is invoked to complete handling of the event. Since invoking the routine 222 may cause preemption, e.g., due to the asynchronous nature of events, the routine 222 may execute in an arbitrary thread context and may effect how the code that executes in the context of the current thread accesses data structures, uses locks, and interacts with other threads executing on the processor core. Moreover, software executing in supervisor privilege level may be generally carefully designed to avoid potential issues due to preemption including, for example, putting restrictions on the locks that may be acquired and interactions with other software components. Accordingly, in one embodiment, instead of introducing a new source of preemption due to the need to handle the monitored events which are asynchronous in nature and add software support for this, an existing interruption mechanism may be used so that when an event that is being monitored (e.g., with reference to data stored in the channels 218) occurs, it results in an interrupt being generated (e.g., by the logic 221) and the routines 222 may be, in turn, invoked.

Figure 3:
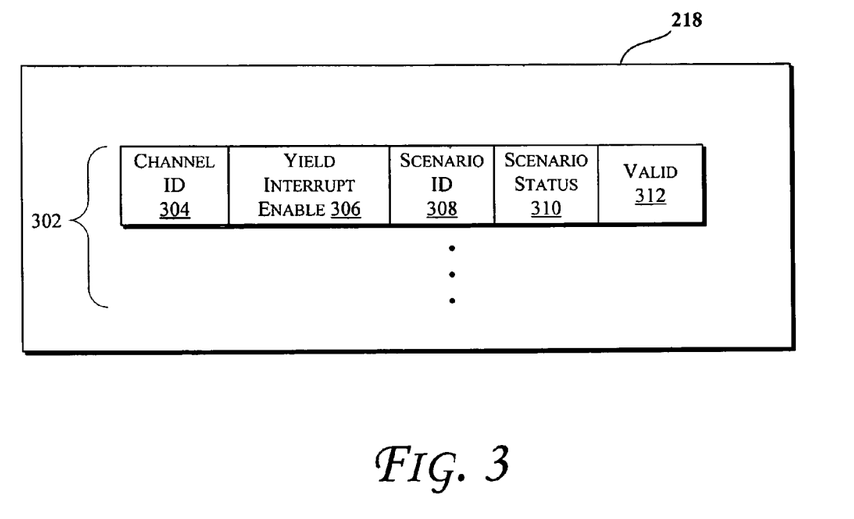
FIGS. 3 and 4 illustrate portions of various types of data, according to various embodiments.

FIG. 3 illustrates a block diagram of portions of data stored in the channels 218 of FIG. 2 for supervisor privilege level, according to an embodiment. The channels 218 may store data including, for example, one or more entries 302. Each entry 302 may include one or more of: a channel identifier (ID) field 304 (e.g., that correspond to one of the channels 218 of FIG. 2), a yield interrupt enable field 306 (e.g., to indicate whether a corresponding yield is enabled to trigger an interrupt), a scenario identifier field 308 (e.g., to identify a scenario), a scenario status field 310 (e.g., to indicate the occurrence of the scenario identified by field 308), and an entry valid field 312 (e.g., to indicate whether the corresponding entry is valid which may enable or disable a channel identified by the field 304). In an embodiment, each channel 218 of FIG. 2 may contain scenario specification where a scenario corresponds to one or more architectural events and is identified by a scenario identifier (308). In one embodiment, the list of scenario identifiers may be enumerable by making use of an instruction (such as CPUID instruction, in accordance with at least one instruction set architecture). Also, in one embodiment, the data corresponding to the channels 218 may be stored in hardware registers (e.g., including registers 216). Further details regarding usage of the fields 304-312 will be discussed with reference to FIG. 5.

Figure 4:
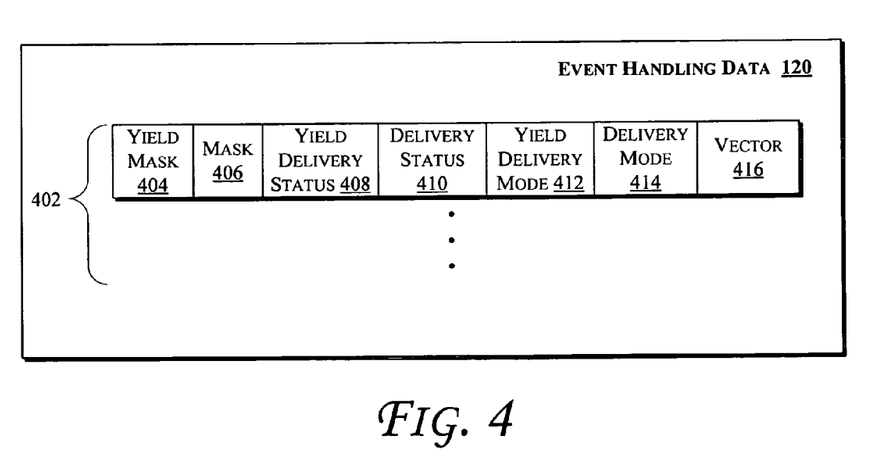

FIG. 4 illustrates a block diagram of portions of the event handling data 120 of FIGS. 1-2, according to an embodiment. In some embodiments, event handling data 120 shown in FIG. 4 may be shared with data corresponding to event monitoring interrupts. For example, in some embodiments, a local vector table (LVT) used for a performance monitor interrupt mechanism may be modified such as shown in FIG. 4. More particularly, FIG. 4 illustrates various entries that may correspond to a modified LVT, according to one embodiment. As shown in FIG. 4, the event handling data 120 may include one or more entries 402. Each entry 402 may include one or more of: a yield mask field 404 (e.g., to mask or unmask the corresponding yield interrupt), a mask field 406 (e.g., to mask or unmask the corresponding interrupt), a yield delivery status field 408 (e.g., to indicate the delivery status of the corresponding yield interrupt), a delivery status field 410 (e.g., to indicates whether the interrupt is idle or whether the interrupt is sent, but pending acceptance, for example), a yield delivery mode field 412 (e.g., which may differ from the delivery modes supported for performance monitor interrupts in field 414), a delivery mode field 414 (e.g., to select the delivery mode), and a vector field 416 (e.g., which may contain the vector number associated with the performance monitor interrupt to enable access to the corresponding interrupt service routine 222). In an embodiment, fields 404, 408, and/or 412 may be reserved in the unmodified version of the LVT.

Furthermore, in an embodiment, the logics 220 and/or 221 may correspond to an advanced programmable interrupt controller (APIC) which maintains the interrupt vector number and the type of interrupt that may be delivered when the counter overflow occurs. Furthermore, the OS 224 may allow for software profiling tools to register an interrupt handler that receives control when the interrupt occurs. For instance, the profiling interrupt may be used by an analyzer tool to collect samples for detecting hot spots in the code that is currently executing and allows programmers to tune the software based on the analysis of the hot spots. Accordingly, in some embodiments, the performance monitor interrupt mechanism may be enhanced to enable yield event interrupts along with performance monitor interrupts, for example, by allowing passage of an interrupt to the next handler if a counter overflow condition is not detected. Moreover, the APIC may support a local vector table entry for a performance monitor interrupt that is to be programmed with the vector number of the vector associated with the performance monitor interrupt. The APIC may deliver the performance monitor interrupt provided that interrupts are not masked and the current interrupt priority level is lesser than the interrupt priority level associated with the performance monitor interrupt.

In some embodiments, contrary to a general-purpose interrupt that may be invoked in response to an external signal provided to a processor, yield event interrupts generated by the logic 221 may not be directly tied to an external device. For example, in one embodiment, the yield conversion logic 221 may cause generation of a performance monitor interrupt (e.g., in response to the yield) which may be an architectural extension used to monitor the performance of software executing on a processor (such as the core 106 of FIGS. 1-2). Generally, a performance monitor interrupt mechanism may be used to profile and tune software by monitoring events that may cause performance issues, such as branch mispredictions, cache misses, etc. In some embodiments, the performance monitor interrupt may be tied to one or more performance monitor counters and the events that are programmed for the counters. For example, software may be notified through a performance monitor interrupt after a corresponding counter overflows.

In an embodiment, if a performance monitor interrupt and an yield event occur at the same time, the performance monitor interrupt may be delivered first and yield events may be held pending and delivered after the performance monitor interrupt completes. In one embodiment, since the interrupt is shared among the performance monitor interrupt and the yield event handler, the interrupt service routines 222 may check if the source of the interrupt was caused due to a counter overflow or if occurred due to an APE scenario that caused a yield event interrupt to occur by checking the contents of the corresponding channel 218. In one embodiment, the channel generating the yield interrupt may be reprogrammed by one of the service routines 222. Furthermore, for multiple channels the yield events interrupts may be delivered one after another based on the channel priority, for example.

In an embodiment, instead of sharing the yield interrupt with the performance monitor interrupt, an additional field for each entry 402 may be introduced and the operating system hardware abstraction layer may be modified to support yield event interrupts and allow other software executing in privileged mode to register yield event interrupt service routines. Supervisor privilege level channels may share the same vector number (416) and, in turn, each yield event interrupt handler written by a programmer may check if the source of the interrupt was due to the channel that was programmed by the programmer.

In one embodiment, the APIC (e.g., including the logics 220 and/or 221) may mask further performance interrupts once a performance monitor interrupt has been delivered and sets the mask field 406. Furthermore, software may unmask the performance interrupts by clearing the mask field 406. Further details regarding usage of the fields within the event handling data 120 of FIG. 4 will be discussed with reference to FIG. 5.

Figure 5:
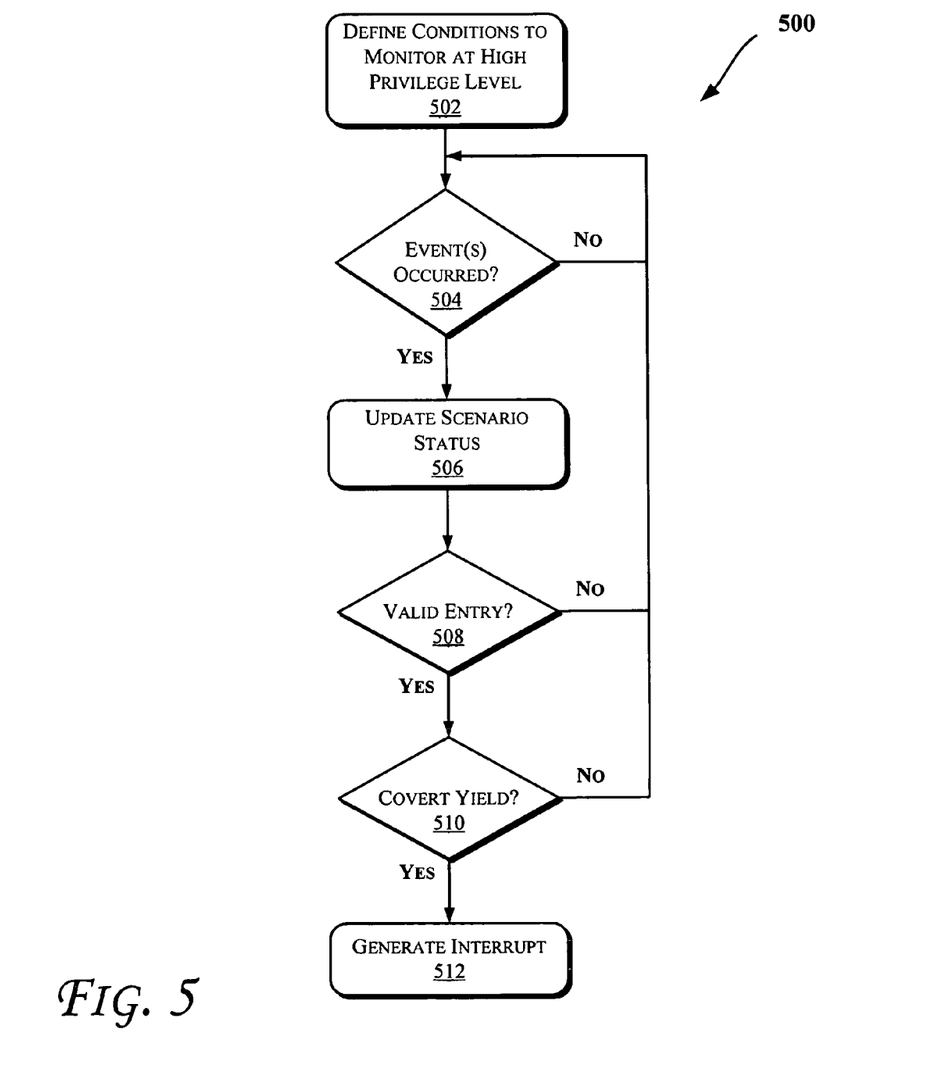
FIG. 5 illustrates a flow diagram of a method to generate an interrupt in response to occurrence of a yield event, according to an embodiment.

FIG. 5 illustrates a flow diagram of a method 500 to generate an interrupt in response to occurrence of a yield event, according to an embodiment. In some embodiments, various components discussed with reference to FIGS. 1-4 and 6-7 may be utilized to perform one or more of the operations discussed with reference to FIG. 5. For example, at least some of the operations discussed with reference to FIG. 5 may be performed by reference to the description table entries of FIG. 3 or 4.

Referring to FIGS. 1-5, at an operation 502, various conditions (such as scenarios) may be defined (e.g., by a programmer). In an embodiment, data corresponding to the defined conditions of operation 502 may be stored in the channels 218. Also, various information relating to the event handling data 120 of FIGS. 3 and 4 may be configured at operation 502, such as one or more of the fields 306, 312, 404, and/or 412, depending on the implementation. At an operation 504, it is determined whether one or more architectural events (e.g., corresponding to a scenario) have occurred. In an embodiment, the logic 220 may determine whether one or more architectural events (e.g., corresponding to a scenario) in a channel 218 (e.g., corresponding to channel ID field 304) have occurred at operation 504. Once operation 504 determines the occurrence of a monitored event, corresponding scenario status may be updated at operation 506. In an embodiment, the logic 220 (or another logic provided within the processor core 106) may update the scenario status field 310 to indicate the occurrence of the scenario corresponding to the scenario ID field 308 at operation 506. At an operation 508, it may be determined whether a corresponding valid entry exists. In an embodiment, at operation 508, the yield conversion logic 221 (or another logic provided within the processor core 106) may determine whether a corresponding valid entry exist with reference to the event handling data 120, e.g., by referring to the valid field 312.

If at operation 508 it is determined that a valid entry exists, it may be determined whether to cause generation of an interrupt (e.g., in response to a corresponding yield) at an operation 510. For example, in one embodiment, if a valid entry exists within the event handling data 120 at operation 508, the yield conversion logic 221 (or another logic provided within the processor core 106) may determine whether to cause generation of an interrupt corresponding to the yield event by referring to the corresponding field (306 or 404) at operation 510. If yield interrupt conversion is enabled at operation 512, an interrupt may be generated at operation 512. In one embodiment, the logic 221 may generate an interrupt at operation 512, e.g., to enable activation of a corresponding interrupt service routine 222 identified by a vector provided within the event handling data 120. In an embodiment, operation 508 may be performed prior to operation 506. Also, at operation 512, the fields 408 may be updated. Further, in embodiments that utilize the performance monitor interrupt mechanism discussed with reference to FIG. 4, operations 506 and/or 508 may not be performed.

In some embodiments, generating interrupts in response to the occurrence response (e.g., a yield event) for supervisor privilege channels may provide an easier migration path that reduces the impact on changes to the operation system code that executes in supervisor privilege level, in part, because supervisor privilege level software may be already aware of how to deal with pre-emption due to interrupts and yield events may also fall into this category as they pre-empt the execution of the current software thread. There are restrictions placed by the operating system on interrupt service routines 222 that can pre-empt the execution of the current thread that is being executed on the processor core 106. For instance, device driver programmers and the operating system may utilize precautions to avoid deadlocks and executing code that may cause the operating system 224 to crash. As discussed herein, if yield events are treated as interrupts, then the same set of restrictions may also apply to the corresponding yield event handling, and a new mechanism to deal with a new kind of pre-emption and the software changes (e.g., including changes to OS 224 and/or device drivers 225) may be avoided.

In some embodiments, in the presence of channels 218 for privilege level 0 (as opposed to lower privilege levels such as a user privilege level, for example), the same occurrence response mechanism may not be as applicable, in part, because yield events cause an asynchronous transfer of control to a different location which is more similar to interrupts in this respect which are also asynchronous events. The software executing at the supervisor privilege level (e.g., privilege level 0) may need control over the asynchronous transfer of control when executing a section of code atomically. Also, an asynchronous transfer of control due to interrupts may cause pre-emption and the interrupt service routine may continue to execute in the context of the current software thread that is scheduled to execute by the operating system 224, the pre-emption routine may abide by certain restrictions, e.g., when it comes to accessing data structures (memory locations), locks, and interaction with other threads.

Furthermore, in one embodiment, an occurrence response mechanism enables conversion of a yield event to an interrupt and allows yield events to occur and pre-empt software threads that may be executing without breaking any of the existing software or introducing new code (including without operating system modifications) and mechanisms to deal with yield event pre-emption. In some embodiments, privileged channels (such as channels 218 corresponding to supervisor privilege level) may or may not be virtualized on a per software thread context basis (e.g., depending on the usage model and the events that are being monitored) and they may not need to be saved or restored. There may be new instructions introduced that allow privilege channels to be saved or restored. Depending on the scenarios that are supported, the operating system software or driver software that executes in privilege level 0 may save or restore channel state.

In accordance with at least one embodiment, the following pseudo-code may be utilized to perform some operations discussed herein, e.g., with reference to FIGS. 1-5:

```
EMONITOR
...
ADD EAX, [EBX]
INC EAX
MUL ECX, [EAX+EDX]
MOV [ESI], ECX
...
```

In the above code, EMONITOR may indicate the start of the monitoring, e.g., after the operation 502. EMONITOR may also be used to program a channel with a scenario in accordance with various input parameters. Accordingly, EMONITOR may not only indicate the start of monitoring but may also select the events that are going to be monitored. As shown various, instructions may be executed after EMONITOR. At the MUL instruction, a monitored event may occur (504), which may cause the logic 221 to generate an interrupt to invoke the corresponding routine 222. Subsequently, various operations may be performed until the occurrence of an instruction that indicates the termination of the interrupt handling (such as IRET in accordance with at least one instruction set architecture). Upon execution of the interrupt terminating instruction, the core 106 may proceed with the MOV operation. In an embodiment, if the interrupt is masked (e.g., as indicated by reference to field 404), then the interrupt may be held pending and delivered after the interrupt is unmasked.

Figure 6:
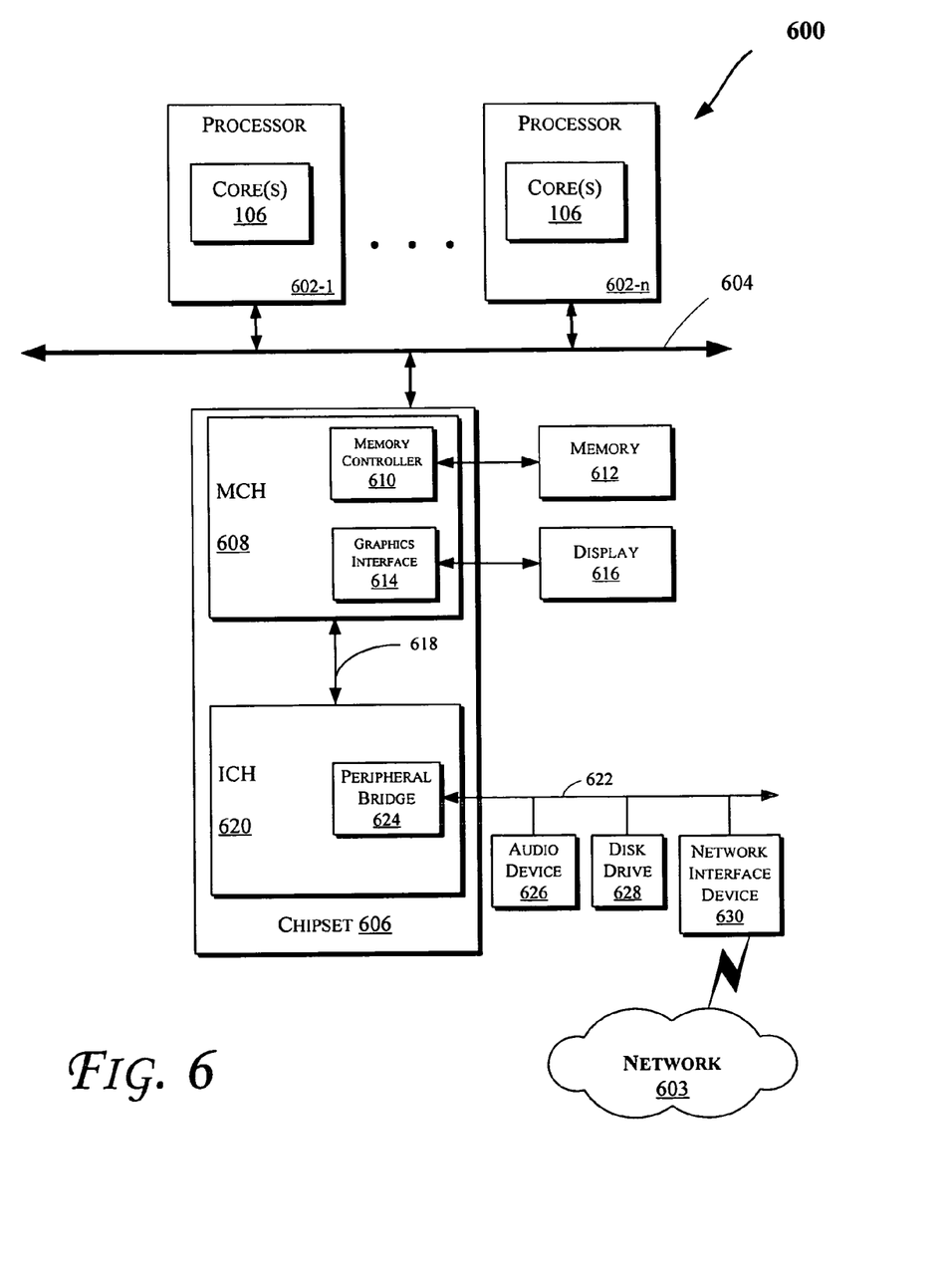

FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include one or more of the cores 106 discusses with reference to FIGS. 1 and/or 2. Also, the operations discussed with reference to FIGS. 1-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 114 of FIG. 1). The memory 612 may store data, including sequences of instructions, that may be executed by the CPU 602, or any other device included in the computing system 600. In one embodiment of the invention, the memory 612 may include one or more volatile storage device(s) (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display device 616. In one embodiment of the invention, the graphics interface 614 may communicate with the display device 616 via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and the MCH 608 may be combined to form a single chip. Furthermore, a graphics accelerator may be included within the MCH 608 in other embodiments of the invention.

Furthermore, the computing system 600 may include volatile and/or nonvolatile memory (or storage unit(s)). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
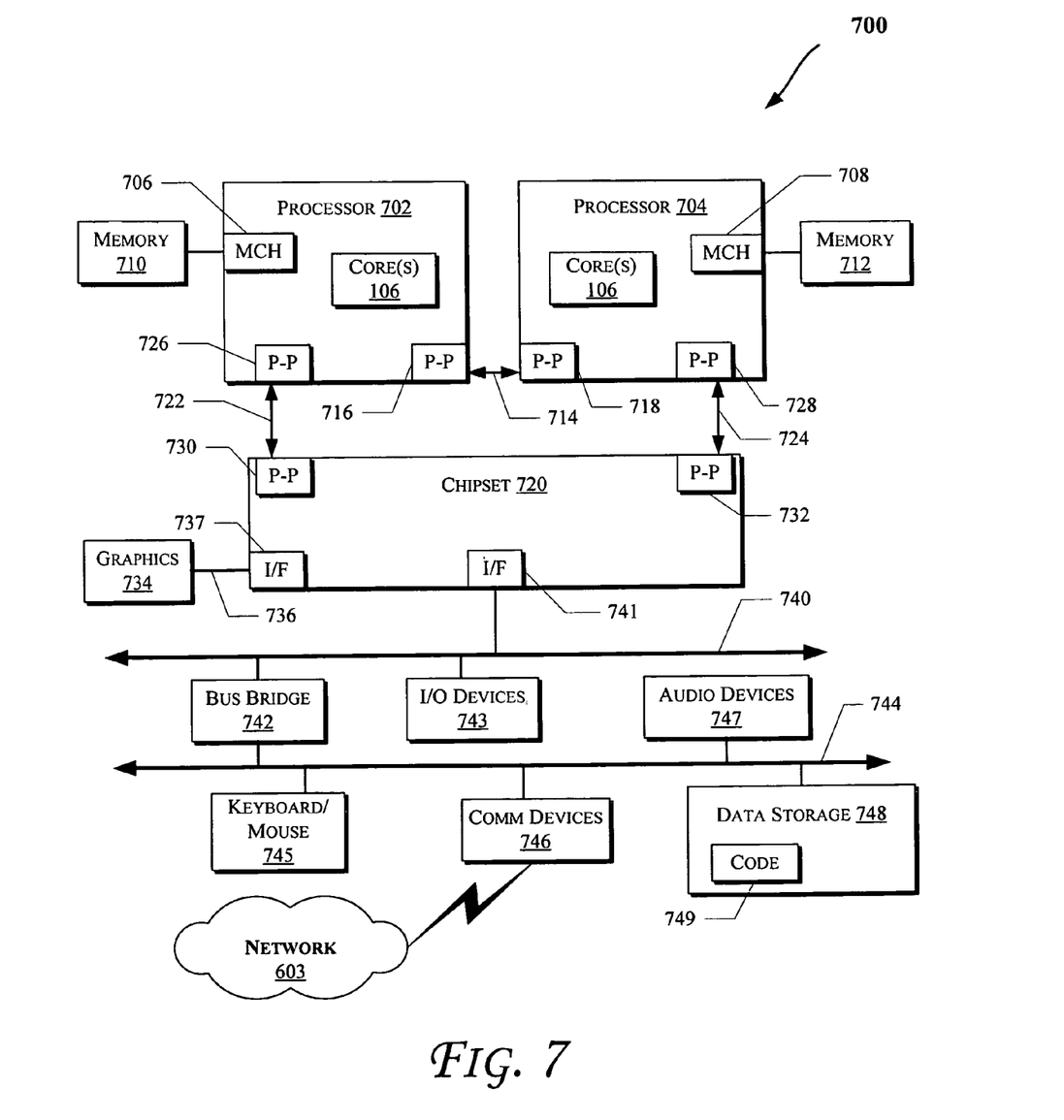

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 612 of FIG. 6.

In an embodiment, the processors 702 and 704 may be one of the processors 602 discussed with reference to FIG. 6. The processors 702 and 704 may exchange data via a point-topoint (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 132. The chipset 720 may further exchange data with a graphics circuit 734 via a graphics interface 736, e.g., using a PtP interface circuit 737.

At least one embodiment of the invention may be provided within the processors 702 and 704. For example, one or more of the cores 106 of FIGS. 1-2 may be located within the processors 702 and 704. Other embodiments of the invention, however, may exist in other circuits, logic units, or devices within the system 700 of FIG. 7. Furthermore, other embodiments of the invention may be distributed throughout several circuits, logic units, or devices illustrated in FIG. 7.

The chipset 720 may communicate with a bus 740 using a PtP interface circuit 741. The bus 740 may communicate with one or more devices, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device 747, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-7.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A processor comprising:
   a channel logic to store a set of conditions for a plurality of channels that each correspond to an architecture state, which if satisfied are to enable a yield event, wherein the set of conditions for each channel of the channel logic includes a channel identifier field to identify a corresponding channel, a scenario status field to indicate an occurrence of the scenario, a yield interrupt enable field to indicate whether a yield event is to be triggered in response to the occurrence of an architectural event, a scenario identifier field to identify the scenario, and an entry valid field to indicate whether an entry corresponding to the channel identifier field is valid;
   a storage unit to store event handling data in one or more entries, wherein each entry comprises a yield mask field to mask or unmask a corresponding yield interrupt, a mask field to mask or unmask a corresponding interrupt, a yield delivery status field to indicate a delivery status of a corresponding yield interrupt, a delivery status field to indicate whether an interrupt is idle or whether an interrupt is sent, a yield delivery mode field, a delivery mode field to select a delivery mode, and a vector field;
   a detection logic to detect whether the set of conditions are satisfied for a particular channel and to cause generation of an interrupt in response thereto to cause the yield event to occur; and
   a yield conversion logic to cause generation of the interrupt corresponding to the yield event at least in part based on a value stored in a yield interrupt enable field of the channel logic.

2. The processor of claim 1, wherein the set of conditions further comprises a scenario specification to define a scenario corresponding to an architectural event.

3. The processor of claim 1, wherein the scenario status field is to be updated in response to an occurrence of the scenario.

4. The processor of claim 1, further comprising a storage unit to store one or more bits of data to indicate whether the detection logic is to cause generation of the interrupt.

5. The processor of claim 4, wherein the storage unit comprises one or more of a private cache, a shared cache, or hardware registers.

6. The processor of claim 1, wherein the interrupt corresponds to a performance monitor interrupt.

7. The processor of claim 1, further comprising a storage unit to store one or more bits of data to indicate whether the detection logic is to cause the interrupt to be generated, wherein one of the channel logic or the detection logic is to update a corresponding entry of the storage unit after occurrence of an architectural event.

8. The processor of claim 1, further comprising a memory to store an interrupt service routine that is invoked in response to the interrupt.

9. The processor of claim 1, further comprising an execution unit that comprises the channel logic.

10. The processor of claim 1, further comprising one or more channels to store data corresponding to a plurality of architectural events.

11. The processor of claim 1, further comprising a plurality of processor cores, wherein at least one of the plurality of processor cores comprises one or more of the channel logic or the detection logic.

12. The processor of claim 1, wherein one or more of the channel logic, the detection logic, a plurality of processor cores, or a cache are on a same integrated circuit die.

13. The processor of claim 1, wherein the yield conversion logic is to determine whether to cause generation of the interrupt corresponding to the yield event at least in part based on a value stored in a yield mask field of an event handling data storage.

14. A method comprising:
- determining whether a set of conditions for a channel are satisfied, which if satisfied are to enable a yield event, wherein the set of conditions for each channel of the channel logic includes a channel identifier field to identify a corresponding channel, a scenario status field to indicate an occurrence of the scenario, a yield interrupt enable field to indicate whether a yield event is to be triggered in response to the occurrence of an architectural event, a scenario identifier field to identify the scenario, and an entry valid field to indicate whether an entry corresponding to the channel identifier field is valid;
- accessing a storage unit to determine whether causing the interrupt to be generated is enabled, wherein each entry of the storage unit comprises a yield mask field to mask or unmask a corresponding yield interrupt, a mask field to mask or unmask a corresponding interrupt, a yield delivery status field to indicate a delivery status of a corresponding yield interrupt, a delivery status field to indicate whether an interrupt is idle or whether an interrupt is sent, a yield delivery mode field, a delivery mode field to select a delivery mode, and a vector field; and
- in response to a determination that the set of conditions are satisfied and a value stored in a yield interrupt enable field of a channel logic, generating an interrupt in order to cause the yield event to occur.

15. The method of claim 14, further comprising defining one or more conditions to monitor at the privilege level.

16. The method of claim 14, further comprising invoking an interrupt service routine in response to the interrupt.

17. A system comprising:
- a memory to store information, corresponding to a set of conditions;
- a channel logic accessible only according to a privilege level that is higher than a user privilege level, wherein the channel logic is to be programmed with the set of conditions, which if satisfied are to enable a yield event, wherein the set of conditions for each channel of the channel logic includes a channel identifier field to identify a corresponding channel, a scenario status field to indicate an occurrence of the scenario, a yield interrupt enable field to indicate whether a yield event is to be triggered in response to the occurrence of an architectural event, a scenario identifier field to identify the scenario, and an entry valid field to indicate whether an entry corresponding to the channel identifier field is valid;
- a storage unit to store event handling data in one or more entries, wherein each entry comprises a yield mask field to mask or unmask a corresponding yield interrupt, a mask field to mask or unmask a corresponding interrupt, a yield delivery status field to indicate a delivery status of a corresponding yield interrupt, a delivery status field to indicate whether an interrupt is idle or whether an interrupt is sent, a yield delivery mode field, a delivery mode field to select a delivery mode, and a vector field;
- a detection logic to detect whether the set of conditions are satisfied and to cause generation of an interrupt in response thereto in order to cause the yield event to occur;
- a yield conversion logic to determine whether to cause generation of the interrupt corresponding to the yield event at least in part based on a value stored in a yield interrupt enable field of the channel logic.

18. The system of claim 17, wherein at least one of set of conditions is to correspond to an architectural event.

19. The system of claim 17, wherein the privilege level corresponds to a supervisor privilege level.

20. The system of claim 17, wherein the interrupt corresponds to a performance monitor interrupt.

21. The system of claim 17, further comprising an audio device coupled to the memory.

* * * * *